United States Patent [19]

Sanders, Jr. et al.

[11] Patent Number: 4,509,981

[45] Date of Patent: Apr. 9, 1985

[54] COATING COMPOSITIONS

[75] Inventors: Albert J. Sanders, Jr., Toledo, Ohio; Michael J. Larson, Ypsilanti, Mich.

[73] Assignee: SWS Silicones Corporation, Adrian, Mich.

[21] Appl. No.: 503,920

[22] Filed: Jun. 13, 1983

[51] Int. Cl.³ .......................... C09D 3/49; C09G 1/12
[52] U.S. Cl. .................................. 106/3; 106/287.11; 106/287.12; 106/287.13; 106/287.16
[58] Field of Search ................. 106/3, 287.11, 287.12, 106/287.13, 287.16

[56] References Cited

U.S. PATENT DOCUMENTS

| | | | |
|---|---|---|---|
| 3,068,153 | 12/1962 | Morehouse | 167/90 |
| 3,256,312 | 6/1966 | Strobel et al. | 26/465 |
| 3,462,475 | 8/1969 | Strobel et al. | 106/10 |
| 3,644,466 | 2/1972 | Strobel et al. | 106/3 |
| 4,246,029 | 1/1981 | Sanders, Jr. | 106/3 |

OTHER PUBLICATIONS

*Chemical Abstracts,* vol. 76, No. 12, Abstract No. 60, 457h, Ito, Koichi et al., "Polysiloxane Containing Ultraviolet Absorbents", Japan Pat. No. 710 2575, Jan. 22, 1971.

*Primary Examiner*—A. Lionel Clingman
*Assistant Examiner*—Amelia B. Yarbrough

[57] ABSTRACT

Coating compositions comprising an aqueous emulsion of (1) a mixture of silicone fluids consisting of (a) an aminofunctional silicone fluid and (b) an organopolysiloxane fluid, (2) nonionic emulsifying agents and (3) an ultraviolet radiation absorbing agent.

14 Claims, No Drawings

COATING COMPOSITIONS

The present invention relates to coating compositions and more particularly to coating compositions containing ultraviolet radiation absorbing agents for coating vinyl surfaces.

BACKGROUND OF THE INVENTION

Coating compositions are described, for example in U.S. Pat. No. 3,960,575 to Martin, in which an aminofunctional silicone fluid and hydroxyl-terminated organopolysiloxanes and/or silicone resins are added to detergent resistant polish compositions. Also, U.S. Pat. No. 3,508,933 to Yates describes a composition containing the reaction product of a hydroxyl-terminated polydimethylsiloxane and an aminoalkyltrialkoxysilane. A composition which is obtained from the partial hydrolysis and condensation of a silanol end-blocked polydimethylsiloxane having 5 siloxy units, an aminoalkyltrialkoxysilane and an aminoalkoxyalkyltrialkoxysilane is described in U.S. Pat. No. 3,544,498 to Holdstock et al. Also, U.S. Pat. No. 3,817,889 to Fink et al describes a composition containing hydroxyl-terminated organopolysiloxanes and methylsiloxanes having amine groups linked to the SiO groups of the methylsiloxanes through a bivalent hydrocarbon radical and an organic tin catalyst. A vinyl coating composition is also disclosed in U.S. Pat. No. 4,246,029 to Sanders, Jr., in which the composition contains an aminofunctional silicone fluid, an organopolysiloxane fluid and a mixture of nonionic surface active agents. Also, U.S. Pat. No. 4,247,330 to Sanders, Jr., discloses an aqueous emulsion containing an aminofunctional silicone fluid, a cyclic siloxane, an aliphatic alcohol, a carboxylic acid and cationic emulsifying agents.

Even though these compositions may provide protection against the environment and impart a high gloss to the treated surface, many of these compositions have a tendency to deteriorate on exposure to sunlight as do the substrates to which they are applied. In an attempt to reduce this decomposition it has been suggested that compositions which absorb ultraviolet rays be incorporated in these transparent coating compositions. However, it was found that some of the compositions which absorb ultraviolet rays are not compatible with the coating compositions. For example, some of the ultraviolet radiation absorbers will cause separation and/or discoloration of the compositions.

Ultraviolet radiation absorbers and their use as stabilizers for plastic materials are known in the art. For example, U.S. Pat. No. 3,395,116 to Dressler et al discloses adding bis(3-hydroxy-4-benzoylphenoxy)diphenylsilane to polyethylene, polypropylene, polystyrene, polyvinyl chloride or polyester resins to stabilize these plastic materials against degradation. Also, U.S. Pat. No. 3,076,017 to Grisley, Jr., discloses adding salicylic acid esters as ultraviolet radiation absorbers to suntan lotions. U.S. Pat. No. 3,256,312 to Strobel et al discloses adding α-cyano-β-alkyl substituted cinnamic acid esters to film-forming plastics, resins, gums, waxes and the like to reduce photochemical degradation and prevent discoloration. Strobel also discloses in U.S. Pat. No. 3,462,475 the addition of α-cyano-β-alkyl substituted cinnamic acid amides to film-forming plastics, resins, gums, waxes and the like to prevent degradation of these materials. U.S. Pat. No. 3,767,690 to Speier discloses organosilicon cinnamates as sun screens for cosmetic materials and protective coatings such as paints. Sunburn preventive compositions which have used organic ultraviolet radiation absorbing compounds such as ortho and para-aminobenzoic acid and their derivatives, salicylic acid and its derivatives are disclosed in U.S. Pat. No. 3,068,153 to Morehouse.

It has now been found that certain water insoluble organic ultraviolet radiation absorbing compounds are compatible with compositions containing aminofunctional silicone fluids, i.e., they will not cause discoloration or separation of the compositions.

Therefore, it is an object of this invention to provide a composition containing ultraviolet radiation absorbing agents. Another object of this invention is to provide a composition containing an aminofunctional silicone fluid and ultraviolet radiation absorbing agents. Still another object of this invention is to provide a coating composition which does not deteriorate when exposed to ultraviolet rays, and protects the substrate to which it is applied. A further object of the present invention is to provide a coating which is resistant to sunlight. A still further object of the present invention is to provide a coating composition which does not discolor in the presence of ultraviolet radiation absorbing agents.

SUMMARY OF THE INVENTION

The foregoing objects and others which will become apparent from the following description are accomplished in accordance with this invention, generally speaking, by providing a coating composition containing (1) a mixture of silicone fluids consisting of (a) an aminofunctional silicone fluid and (b) an organopolysiloxane fluid, (2) nonionic emulsifying agents, (3) an ultraviolet radiation absorbing agent and (4) water. The silicone fluids (1) are present in the composition in an amount of from 1 to 60 percent by weight and the emulsifying agents (2) are present in an amount of from 2 to 10 percent by weight based on the total weight of the composition, including water.

DESCRIPTION OF THE INVENTION

Organopolysiloxane fluids which may be employed in the compositions of this invention are linear or branched fluids. The linear fluids may be represented by the general formula:

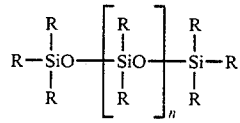

in which R represents monovalent hydrocarbon radicals having from 1 to 18 carbon atoms or hydroxyl groups and n is a number greater than 5. When the organopolysiloxane fluids are hydroxyl containing fluids, then at least two of the R groups must be hydroxyl groups.

Monovalent hydrocarbon radicals represented by R are alkyl radicals, e.g., methyl, ethyl, propyl, butyl, octyl, dodecyl and octadecyl radicals; aryl radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl radicals; alkaryl radicals, e.g., tolyl, xylyl, and ethylphenyl radicals; aralkyl radicals, e.g., benzyl, alphaphenylethyl, beta-phenylethyl and the alpha-phenylbutyl radicals.

The organopolysiloxane fluids, which may be either linear or branched chain siloxanes, have an average of from 1.75 to about 2.25 organic radicals per silicon atom. These organopolysiloxane fluids may have a viscosity of from 5 to 1,000,000 cs. at 25° C. and more preferably from about 100 to 300,000 cs. at 25° C. Also, it is possible to blend high and low viscosity fluids to form a fluid having the desired viscosity range.

Examples of suitable organopolysiloxane fluids are hydroxyl containing polydiorganosiloxanes such as hydroxyl terminated polydimethylsiloxanes, hydroxyl terminated polydiethylsiloxanes, and copolymers having dimethylsiloxane units and diphenylsiloxane units or methylphenyl and dimethylsiloxane units. Preferably the organopolysiloxanes are hydroxyl terminated and/or triorganosiloxy terminated polydiorganosiloxanes. These organopolysiloxane fluids are well known in the art and consist predominately of diorganosiloxane units of the formula ($R_2SiO$).

The aminofunctional silicone fluids employed in the aqueous emulsions of this invention may be prepared by equilibrating a mixture containing an organopolysiloxane and an aminofunctional silane or siloxane in the presence of an equilibration catalyst. Siloxanes which may be used in the preparation of these aminofunctional silicone fluids are cyclic siloxanes of the general formula

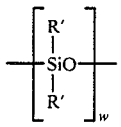

or linear or branched organopolysiloxanes having the general formula $R'_y SiO_{(4-y)/2}$ in which R' represents monovalent hydrocarbon radicals having from 1 to 18 carbon atoms, y is a number of from about 1 to 2.5 and w is a number of from 3 to 10.

Examples of suitable cyclic organopolysiloxanes which may be used in the formation of these aminofunctional silicone fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which w has a value of from 3, 4 or 5 are preferred.

Examples of linear siloxanes which may be used are triorganosiloxy end-blocked organopolysiloxanes such as trimethylsiloxy end-blocked dimethylpolysiloxanes, diethylpolysiloxanes, methylphenylpolysiloxanes, diphenylpolysiloxanes and copolymers thereof.

The aminofunctional silanes or siloxanes which are reacted with the cyclic siloxanes or organopolysiloxanes may be represented by the general formula

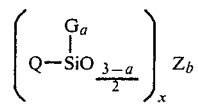

in which G represents the radicals, R', OR″, OR‴ NR″$_2$, or OSiR′$_3$ in which R' is the same as above, R″ represents hydrogen or a monovalent hydrocarbon radical having from 1 to 18 carbon atoms, R‴ is a substituted or unsubstituted divalent hydrocarbon radical having from 1 to 18 carbon atoms, a substituted or unsubstituted divalent hydrocarbonoxy radical in which the oxygen is in the form of an ether linkage or an unsaturated divalent hydrocarbon radical, Q represents the radicals

R″$_2$NR‴—,

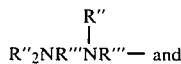

R″$_2$NR‴OR‴—,

Z is a radical selected from the group consisting of R″O$_{0.5}$, R′$_3$SiO$_{0.5}$ and R″$_2$NR‴O$_{0.5}$, in which R', R″ and R‴ are the same as above, a is a number of from 0 to 2, b is a number of from 0 to 3 and x is a number of from 1 to 20,000.

Examples of suitable divalent radicals represented by R‴ are hydrocarbon radicals having from 2 to 18 carbon atoms such as ethylene, trimethylene, tetramethylene, hexamethylene, octamethylene; hydrocarbonoxy radicals having the formula (—OC$_2$H$_4$—)$_r$, (—OC$_2$H$_4$OCH$_2$—)$_r$ and
(—OC$_3$H$_6$—)$_r$, in which r is a number of from 1 to 50 such as oxyethylene, oxypropylene and higher polymers thereof and alkylene radicals such as vinylene, propenylene, butenylene, hexenylene and the like.

Examples of suitable aminofunctional silanes are beta-aminopropyltriethoxysilane, gamma-aminopropyltrimethoxysilane, methyl-beta-(aminoethyl)-gamma-aminopropyldimethoxysilane, beta-aminoethyl-gamma-aminopropyltrimethoxysilane, omega-aminohexyltributoxysilane, beta-(aminoethoxy)hexyltriethoxysilane, beta-(aminopropoxy)butyltributoxysilane and methyl-beta-(aminopropoxy)propyldi-(aminoethoxy)silane.

The aminofunctional silicone fluids and methods for preparing the same are described in U.S. Pat. No. 3,890,269 to Martin, which is incorporated herein by reference.

Other aminofunctional silicone fluids which may be used in the coating compositions of this invention are those obtained from the reaction of polyaminoalkylalkoxysilanes of the formula $R'_a(E_hM)Si(OR')_{3-a}$ or the corresponding siloxanes with organosiloxanes of the general formula

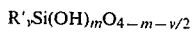

where R' is the same as above, M is an aliphatic hydrocarbon radical having from 1 to 10 carbon atoms and having a valence of h+1, where h is a number of from 1 to 3, E is a monovalent radical attached to M by a carbon-nitrogen bond and is composed of carbon, nitrogen and hydrogen atoms and contains at least one amine group, a is a number of from 0 to 2, m has a positive average value up to and including 2, and v is a number of from 0.5 to 2.49 and the sum of m and v has an average value up to and including 3.

These aminofunctional siloxane copolymers may be prepared by contacting the aminofunctional silanes or the corresponding siloxanes with an organosiloxane in a liquid phase in accordance with the procedure described in U.S. Pat. No. 3,355,424 to Brown. Generally, the reaction will proceed rather slowly at room temperature, however, the reaction rate may be accelerated by heating the reaction mixture at temperatures of from 50° to about 200° C.

Other aminofunctional silicone fluids which may be used are tertiary aminoorganosilanes or siloxanes which have at least one ether linkage in the organic group connecting the tertiary amine group to the silicon atoms. The tertiary aminoorganosiloxanes may be represented by the general formula

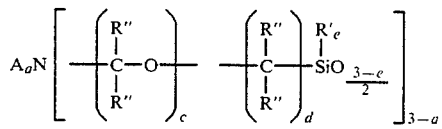

in which A is a monovalent hydrocarbon radical, a hydroxy terminated polyalkyleneoxy group, an alkenyloxy terminated polyalkyleneoxy group, a hydroxyalkyl group, a tertiary aminoalkyl group or a divalent group which together with the nitrogen atom forms a heterocyclic ring, R' is a monovalent hydrocarbon radical, R" is a monovalent hydrocarbon radical having from 1 to 18 carbon atoms or hydrogen, a is a number of from 0 to 2, c and d are each numbers of from 1 to 10 and e is a number of from 0 to 2.

These tertiary aminoorganosiloxanes may be prepared by a platinum catalyzed addition reaction of an alkenyl ether of a tertiary hydroxyalkyl amine and a hydrosilicon compound (i.e., a silane or siloxane containing silicon-bonded hydrogen) in accordance with the procedure described in U.S. Pat. No. 3,402,191 to Morehouse. Generally, temperatures from 100° C. to about 160° C. are preferred and solvents for the reactants (e.g., ethylene glycol dimethylether) can be employed, particularly where the reactants are incompatible and/or it is desired to minimize cross-linking. It is preferred that the addition reaction be conducted under an atmosphere of inert gas to minimize side reactions.

Other aminofunctional silicone fluids which may be used are those derived from the condensation and/or the partial hydrolysis and condensation of a liquid hydroxyl containing polydiorganosiloxane having the formula

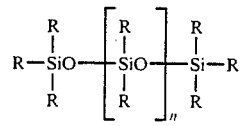

where R and n are the same as above and at least two R groups are hydroxyl groups per molecule, with various mole ratios of an aminoalkoxyalkylsilane or an aminoalkoxyalkenylsilane having the formula

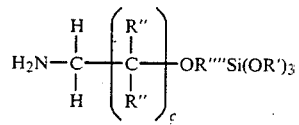

and, if desired, aminoalkylsilanes having the formula

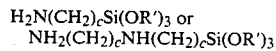

or from the condensation of the above hydroxyl containing polydiorganosiloxane with the above aminofunctional silanes in various mole ratios in which R', R" and c are the same as above, R"" is a divalent alkylene radical having from 2 to 10 carbon atoms or a divalent alkenylene radical having from 3 to 8 carbon atoms and an olefinic bond on the carbon atom adjacent to the silicon atom. These aminofunctional organopolysiloxane copolymers may be prepared in accordance with the procedure described in U.S. Pat. No. 3,544,498 to Holdstock et al, in which a mixture comprising a hydroxyl containing polyorganosiloxane, an aminoalkyltrialkoxysilane and aminoalkoxyalkyltrialkoxysilane are partially hydrolyzed and condensed. Also, the aminofunctional organopolysiloxanes may be prepared in accordance with the procedure described in U.S. Pat. No. 3,355,424 to Brown in which an aminofunctional silane and hydroxyl containing polyorganosiloxanes are condensed.

The viscosity of the aminofunctional silicone fluids employed in the coating compositions of this invention may range from about 5 up to about 100,000 cs. at 25° C., preferably from about 50 to 50,000 cs. and more preferably from about 100 to 20,000 cs. at 25° C.

Various nonionic emulsifying agents may be employed in the compositions of this invention, if desired, to enhance the formation and/or improve the stability of the aqueous emulsions. Examples of nonionic emulsifiers which may be used are polyoxyethylene alkyl phenols, nonylphenoxypoly(ethyleneoxy)ethanols (available from GAF Corporation), polyoxyethylene sorbitol hexastearate, polyoxyethylene (2 moles) cetyl ether (available from Imperial Chemical Industries of America), trimethyl nonyl ether of polyethylene glycol, (molecular weight about 626, and containing from 6 to 14 ethylene oxide radicals per molecule (available as TERGITOL TMN-10 from Union Carbide Corporation), polyoxyethylene sorbitol oleate (saponification number 102-108 and hydroxyl number 2535 (available as ATLOX 1087 from Imperial Chemical Industries of America).

Preferred nonionic emulsifying agents which may be employed are mixtures containing (a) octylphenoxy polyethoxy ethanol compounds having from 1 to 13 moles of ethylene oxide (available as Triton X-Series from Rohm and Hass Company) and (b) the reaction product obtained from the reaction of ethylene oxide and nonylphenol in a molar ratio of 6:1 to 40:1 (available as Surfonic N-Series from Jefferson Chemical Company, Inc.). The Triton X-Series of emulsifying agents are obtained from the reaction of octylphenol and ethylene oxide.

The weight ratio of octylphenoxy polyethoxy ethanol to the product obtained from the reaction of ethylene oxide and nonylphenol is not critical and may range from about 10 percent octylphenoxy polyethoxy ethanol to about 90 percent of the product obtained from the reaction of ethylene oxide and nonyl phenol to 90 percent of octylphenoxy polyethoxy ethanol compound to 10 percent by weight of the product obtained from the reaction of ethylene oxide and nonylphenol based on the total weight of the emulsifying agents. Preferably the ratio of emulsifying agents ranges from about 20 to 50 percent by weight of the octylphenoxy polyethoxy ethanol compound and from 80 to 50 percent by weight of the product obtained from the reaction of ethylene oxide and nonylphenol, and more preferably from about 30 to 40 percent by weight of the octylphenoxy polyethoxy ethanol compound to about 70 to 60 percent by weight of the product obtained from the reaction of ethylene oxide and nonyl phenol based on the weight of the emulsifying agents.

It has been found that certain water insoluble ultraviolet radiation absorbing agents may be incorporated in the emulsions of this invention without causing discoloration of the emulsions or the resultant films. Examples of ultraviolet radiation absorbing agents which may be incorporated in the aqueous emulsions containing aminofunctional silicone compounds are substituted cinnamic or benzoic acid esters. These ultraviolet radiation absorbing agents may be represented by the general formula

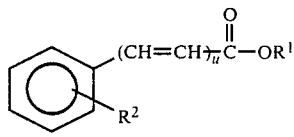

where $R^1$ is a monovalent hydrocarbon radical having up to 12 carbon atoms, an amino-alkyl radical having up to 6 carbon atoms, a mono- or di- alkanolaminoalkyl radical or an alkoxyalkyl radical having from 3 to 12 carbon atoms or a hydroxy substituted alkyl radical having from 2 to 6 carbon atoms, $R^2$ represents hydrogen, OH, $OR^3$, $NH_2$, $NHR^3$, $NR_2^3$ and $R^3$, $R^3$ represents an alkyl radical having from 1 to 4 carbon atoms and u is 0 or 1, with the proviso that when u is 0, $R^2$ is OH, $OR^3$, $NH_2$, $NHR^3$ and $NR_2^3$ and when u is 1, $R^2$ is hydrogen, OH, $OR^3$ and $R^3$.

In the above formulas $R^1$ represents an alkyl radical such as methyl, ethyl, propyl, butyl, hexyl, octyl, decyl and dodecyl radicals; aryl radicals such as the phenyl radical; cycloaliphatic radicals and substituted cycloaliphatic radicals such as the cyclohexyl, cycloheptyl radicals, mono-, di- and tri- methyl substituted cyclohexyl radicals; aralkyl radicals such as the benzyl, phenylethyl and phenylpropyl radicals; alkaryl radicals such as the tolyl and xylyl radicals. Other radicals represented by $R^1$ are (hydroxy alkyl) amino alkyl radicals of the formula $(HOCH_2CH_2)_2 NCH_2CH_2-$ and alkoxy alkyl radicals such as methoxymethyl, methoxyethyl and 2-methoxypropyl radicals.

Examples of suitable alkoxy radicals represented by $OR^3$ are methoxy, ethoxy, propoxy and butoxy radicals.

Suitable examples of monovalent hydrocarbon radicals having from 1 to 4 carbon atoms represented by $R^3$ are alkyl radicals such as methyl, ethyl, propyl and butyl radicals.

Examples of suitable ultraviolet radiation absorbers which may be incorporated in the aqueous emulsions are p-aminobenzoic acid, glyceryl p-aminobenzoate, 2-ethylhexyl p-dimethylaminobenzoate, 2-ethylhexyl salicylate, benzyl salicylate, 3,3,5-trimethylcyclohexyl salicylate, menthyl salicylate, triethanolamine salicylate, 2-ethoxyethyl p-methoxycinnamate and octyl methoxycinnamate.

The amount of ultraviolet radiation absorbers incorporated in the aqueous emulsions is not critical and may range from about 1 to 10 percent by weight based on the weight of the emulsion. Preferably the amount of ultraviolet radiation absorber ranges from about 2 to 8 percent by weight and more preferably from about 3 to 6 percent by weight based on the weight of the emulsion.

Generally, the silicone fluids, i.e., organopolysiloxane fluid and aminofunctional silicone fluids are present in the composition in an amount of from 1 to 60 percent by weight, preferably from about 5 to 40 percent by weight and more preferably from about 10 to 35 percent by weight based on the weight of the composition. For optimum results, the composition preferably contains from 15 to 30 percent by weight of silicone fluids based on the total weight of the composition, i.e., the silicone fluids, emulsifying agent, ultraviolet radiation absorbing agent and water.

The ratio of aminofunctional silicone fluid to organopolysiloxane fluid present in the silicone fluids is not critical and may range from about 1 percent by weight of aminofunctional silicone fluid to 99 percent by weight of organopolysiloxane fluid to 99 percent by weight of aminofunctional silicone fluid to 1 percent by weight of organopolysiloxane fluid based on the weight of the organopolysiloxane fluid and aminofunctional silicone fluid. Preferably the ratio of the aminofunctional silicone fluid ranges from 10 to 40 percent by weight and the amount of organopolysiloxane fluid ranges from 90 to 60 percent by weight based on the total weight of the silicone fluids.

The amount of emulsifying agent present in the coating composition may range from about 2 to about 10 percent, preferably from 3 to 8 percent and more preferably from 3 to 6 percent by weight based on the total weight of the composition, i.e., silicone fluids, emulsifying agent, ultraviolet radiation absorbing agent and water.

The balance of the composition may be water and other ingredients such as preservatives, e.g., formaldehyde and 6-acetoxy-2,4-dimethyl-m-dioxane; wetting agents; perfumes and antifoams.

The coating compositions of this invention may be prepared in any conventional manner. Preferably they are prepared in a mechanical mixing apparatus by adding a predetermined amount of water to the emulsifying agent, the amount of water being equal to or less than the total weight of the emulsifying agent, and thereafter adding the silicone fluids to the resulting blend to form a paste-like composition. Depending on the final concentration, the remaining amount of water is then slowly added to the thus formed paste-like composition with agitation to form an oil in water emulsion.

The compositions of this invention may be applied to vinyl surfaces to form a coating which is resistant to detergents. Also, these compositions impart a high gloss coating to the treated surfaces and protect the surfaces against environmental elements such as grease, dirt, water, road film and sunlight.

In the following examples all parts are by weight unless otherwise specified.

PREPARATION OF AMINOFUNCTIONAL SILICONE FLUIDS (A) An aminofunctional silicone fluid is prepared by heating a mixture containing about 266 parts of octamethylcyclotetrasiloxane, 22 parts of beta-(aminoethyl)-gamma-aminopropyltrimethoxysilane and 0.3 parts of potassium hydroxide to a temperature of 145° C. for three hours. After cooling the liquid product to room temperature 0.3 parts of acetic acid are added to neutralize the catalyst. The product is filtered and a liquid product having a viscosity of about 40 cs. at 25° C. is recovered. Nuclear Magnetic Resonance analysis indicates that the ratio of beta-(aminoethyl)-gamma-aminopropyl to $OCH_3$ to $(CH_3)_2SiO$ groups is about 1:3:36.

(B) An aminofunctional silicone fluid is prepared by reacting 9 parts of beta-(aminoethoxy)propyltrimethoxysilane, 316 parts of hexamethylcyclotrisiloxane and 0.3 parts of n-butyllithium at a temperature of about 125° C. The resultant product which is neutralized with 0.3 parts of acetic acid has a viscosity of about 125 cs. at 25° C. The ratio of beta-(aminoethoxy)propyl groups to $OCH_3$ groups to $(CH_3)_2SiO$ groups is about 1:3.1:98.

(C) An aminofunctional silicone fluid is prepared by heating 129 parts of a hydrosiloxane having the average formula

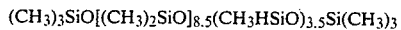
$(CH_3)_3SiO[(CH_3)_2SiO]_{8.5}(CH_3HSiO)_{3.5}Si(CH_3)_3$ with 25 parts of platinum per million parts by weight of the reactants as chloroplatinic acid. About 71 parts of the allyl ether of N,N-dimethylethanolamine having the formula

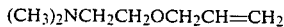
$(CH_3)_2NCH_2CH_2OCH_2CH=CH_2$ are added dropwise while maintaining the reaction mixture at a temperature between about 150° and 158° C. The total time of addition is about 8 minutes. The reaction mixture is heated at 150° C. for an additional 3 hours, then sparged at this temperature for 40 minutes with nitrogen. The resulting product is amber in color and has a viscosity of about 90 cs. at 25° C.

(D) An aminofunctional silicone fluid is prepared by mixing 30 parts of a hydroxyl terminated polydimethylsiloxane of the formula

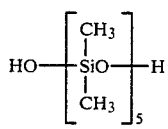

with 8 parts of 3-(3-aminopropoxy)propyltrimethoxysilane and about 12 parts of gamma-aminopropyltrimethoxysilane. The reaction mixture is thoroughly agitated and then 0.4 parts of water are added with agitation. The resulting organopolysiloxane copolymer has a viscosity of about 150 cs. at 25° C.

(E) An aminofunctional silicone fluid is prepared by heating a mixture containing about 150 parts of a (polyaminoalkyl)alkoxysilane having the formula

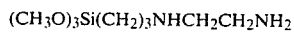
$(CH_3O)_3Si(CH_2)_3NHCH_2CH_2NH_2$ with about 50 parts of a polymer having the formula

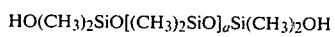
$HO(CH_3)_2SiO[(CH_3)_2SiO]_aSi(CH_3)_2OH$ where the average value of a is such that the polymer contains about 3.5 percent OH groups to a temperature of about 150° C. under reflux conditions, cooled and then about 17 parts of water and about 150 parts of ethanol are added. About one third of the ethanol is removed by distillation. About 75 weight percent of the units of the resulting copolymer have the formula

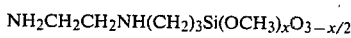
$NH_2CH_2CH_2NH(CH_2)_3Si(OCH_3)_xO_{3-x/2}$ and about 25 weight percent of the units are $(CH_3)_2SiO$. Theoretically the value of x is in the range of between 0 and 1.

EXAMPLE 1

A coating composition is prepared by adding 22 parts of water to a mechanical mixer containing 8 parts of octylphenoxy polyethoxy ethanol having 5 moles of ethylene oxide (available as Triton X-45 from Rohm and Haas Company) and 28 parts of the product obtained from the reaction of ethylene oxide with nonylphenol in a molar ratio of 15 to 1 (available as Surfonic N-150 from Jefferson Chemical Co., Inc.). The ingredients are mixed until a paste-like composition is formed, then 30 parts of 2-ethylhexyl p-methoxycinnamate are added to the paste-like composition. About 210 parts of hydroxy terminated dimethylpolysiloxane fluid having a viscosity of 100 cs. at 25° C. and 70 parts of the aminofunctional silicone fluid prepared in accordance with (A) above, are added in increments over a period of about five minutes and after the addition is completed, the ingredients are mixed for an additional two minutes. An additional 220 parts of water are added in increments over a period of about 15 minutes with continuous agitation. A sample of the above emulsion is heated for 6 days at 50° C., while a similar sample is subjected to 4 cycles of a freeze-thaw test at temperatures ranging from −20° to +25° C. without any apparent evidence of phase separation in either sample. No discoloration of the emulsion is observed after 110 days at room temperature. A sample of the emulsion is applied to a vinyl surface and allowed to dry. After five washings with a detergent solution, the treated vinyl surface exhibits a high gloss and shows excellent water repellancy.

EXAMPLE 2

The procedure of Example 1 is repeated except that 30 parts of octyl p-methoxycinnamate are substituted for the 2-ethylhexyl p-methoxycinnamate. No discoloration is observed after storing for 201 days at room temperature.

EXAMPLE 3

The procedure of Example 1 is repeated except that 35 parts of p-aminobenzoic acid are substituted for the 2-ethylhexyl p-methoxycinnamate. No discoloration of the emulsion is observed after 5 days at room temperature.

EXAMPLE 4

The procedure of Example 1 is repeated except that 30 parts of 2-ethylhexyl p-dimethylaminobenzoate are substituted for the 2-ethylhexyl p-methoxycinnamate. No discoloration is observed after storing for 7 days at room temperature.

EXAMPLE 5

The procedure of Example 1 is repeated except that 30 parts of glyceryl p-aminobenzoate are substituted for the 2-ethylhexyl p-methoxycinnamate. No discoloration is observed in the emulsion.

EXAMPLE 6

The procedure of Example 1 is repeated except that 35 parts of propoxylated ethyl p-aminobenzoate (available as Amerscreen P from Amerchol Corporation) are substituted for the 2-ethylhexyl p-methoxycinnamate. No discoloration of the emulsion is observed.

EXAMPLE 7

The procedure of Example 1 is repeated except that 35 parts of benzyl salicylate are substituted for the 2-ethylhexyl p-methoxycinnamate. No discoloration of the emulsion is observed after 5 days at room temperature.

EXAMPLE 8

The procedure of Example 1 is repeated except that 30 parts of 2-ethylhexyl salicylate are substituted for the 2-ethylhexyl p-methoxycinnamate. No discoloration is observed after storing for 7 days at room temperature. The resultant emulsion exhibits good stability after 4 cycles of the freeze-thaw test at temperatures ranging from $-20°$ to $+25°$ C.

EXAMPLE 9

The procedure of Example 1 is repeated except that 30 parts of 3,3,5-trimethylcyclohexyl salicylate are substituted for the 2-ethylhexyl p-methoxycinnamate. No color change is observed in the emulsion. The emulsion exhibits good stability after 4 cycles of the freeze-thaw test at temperatures ranging from $-20°$ to $+25°$ C.

EXAMPLE 10

The procedure of Example 1 is repeated except that 35 parts of triethanolamine salicylate are substituted for the 2-ethylhexyl p-methoxycinnamate. No discoloration of the emulsion is observed.

EXAMPLE 11

The procedure of Example 1 is repeated except that 35 parts of the aminofunctional silicone fluid prepared in (B) above is substituted for the aminofunctional silicone fluid described in (A) above. The resultant composition is stable in the freeze-thaw test and on heat aging. No discoloration of the emulsion is observed. When the composition is applied to a vinyl surface, a high gloss film is formed which shows excellent water repellency.

EXAMPLE 12

The procedure of Example 1 is repeated except that 35 parts of the aminofunctional silicone fluid prepared in (C) above is substituted for the aminofunctional silicone fluid described in (A) above. The resultant composition is stable in the freeze-thaw test and on heat aging. No discoloration of the emulsion is observed. When the composition is applied to a vinyl surface, a high gloss film is formed which shows excellent water repellency.

EXAMPLE 13

The procedure of Example 1 is repeated except that 35 parts of the aminofunctional silicone fluid prepared in (D) above is substituted for the aminofunctional silicone fluid described in (A) above. The resultant composition is stable in the freeze-thaw test and on heat aging. No discoloration of the emulsion is observed. When the composition is applied to a vinyl surface, a high gloss film is formed which shows excellent water repellency.

EXAMPLE 14

The procedure of Example 1 is repeated except that 35 parts of the aminofunctional silicone fluid prepared in (E) above is substituted for the aminofunctional silicone fluid described in (A) above. The resultant composition is stable in the freeze-thaw test and on heat aging. No discoloration of the emulsion is observed. When the composition is applied to a vinyl surface, a high gloss film is formed which shows excellent water repellency.

EXAMPLE 15

The procedure of Example 1 is repeated except that a mixture containing 150 parts of hydroxyl terminated polydimethylsiloxane and 60 parts of a trimethylsiloxy terminated polydimethylsiloxane having a viscosity of 100 cs. at 25° C. are substituted for the 210 parts of hydroxyl terminated polydimethylsiloxane. No discoloration of the emulsion is observed. When the emulsion is applied to a vinyl surface, a high gloss film is observed.

EXAMPLE 16

The procedure of Example 1 is repeated except that the product obtained from the reaction of ethylene oxide with nonyl phenol in a molar ratio of 15:1 (Surfonic N-150) is omitted and 18 parts of octylphenoxy polyethyleneoxy ethanol (Triton X-45) is used. The resultant composition forms a high gloss film when applied to a vinyl surface; however, it separates into two phases on heat aging.

COMPARISON EXAMPLE $V_1$

The procedure of Example 1 is repeated except that 30 parts of 2-hydroxy-4-isooctoxy-benzophenone are substituted for the 2-ethylhexyl p-methoxycinnamate. The emulsion turns to a deep yellow color after about 12 hours.

COMPARISON EXAMPLE $V_2$

The procedure of Example 1 is repeated except that 30 parts of 2-hydroxy-4-(2-hydroxy-3-methacryloxy)-propoxy-benzophenone are substituted for the 2-ethylhexyl p-methoxycinnamate. The emulsion turns to a dark yellow color after about 12 hours.

COMPARISON EXAMPLE $V_3$

The procedure of Example 1 is repeated except that 35 parts of disodium-2,2'dihydroxy-4,4'-dimethoxy-5,5'-disulfide benzophenone are substituted for the 2-ethylhexyl p-methoxycinnamate. The emulsion turns a deep yellow color after preparation.

COMPARISON EXAMPLE V₄

The procedure of Example 1 is repeated except that 35 parts of 2,2',4,4'-tetrahydroxybenzophenone are substituted for the 2-ethylhexyl p-methoxycinnamate. The emulsion turns to an orange color shortly after preparation.

COMPARISON EXAMPLE V₅

The procedure of Example 1 is repeated except that 30 parts of 2-ethylhexyl-2-cyano-3,3-diphenylacrylate are substituted for the 2-ethylhexyl p-methoxycinnamate. The emulsion turns to a pink color after standing for 12 hours.

COMPARISON EXAMPLE V₆

The procedure of Example 1 is repeated except the aminofunctional silicone fluid is omitted and 30 parts of 2-ethylhexyl-2-cyano-3,3-diphenylacrylate are substituted for the 2-ethylhexyl p-methoxycinnamate. No discoloration is observed after storing for 7 days at room temperature.

What is claimed is:

1. An aqueous emulsion consisting essentially of a mixture of (1) silicone fluids in an amount of from 1 to 60 percent by weight based on the weight of the emulsion, said silicone fluids consisting essentially of (a) from 1 to 99 percent by weight based on the weight of the silicone fluids of an aminofunctional silicone fluid and (b) from 99 to 1 percent by weight based on the weight of the silicone fluids of an organopolysiloxane fluid, (2) a nonionic emulsifying agent in an amount of from 2 to 10 percent by weight based on the weight of the emulsion, (3) an ultraviolet radiation absorbing compound selected from the group consisting of p-aminobenzoic acid and a compound having the formula

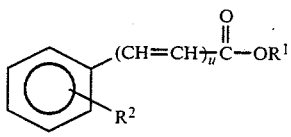

where $R^1$ is selected from the group consisting of a monovalent hydrocarbon radical having from 1 to 12 carbon atoms, an aminoalkyl radical having up to 6 carbon atoms; a monoalkanolaminoalkyl radical, a dialkanolaminoalkyl radical, an alkyl alkoxy radical having from 3 to 12 carbon atoms, a hydroxy substituted alkyl radical having from 2 to 6 carbon atoms, $R^2$ is selected from the group consisting of hydrogen, OH, $OR^3$, $NH_2$, $NHR^3$, $NR_2^3$ and $R^3$, $R^3$ represents an alkyl radical having from 1 to 4 carbon atoms and u is 0 or 1 with the proviso that when u is 0, $R^2$ is OH, $OR^3$, $NH_2$, $NHR^3$ and $NR_2^3$ and when u is 1, $R^2$ is hydrogen, OH, $OR^3$ and $R^3$, and (4) water.

2. The emulsion of claim 1, wherein $R^2$ is selected from the group consisting of OH, $OR^3$, $NH_2$, $NHR^3$, and $NR_2^3$, $R^3$ is an alkyl radical having from 1 to 4 carbon atoms and u is 0.

3. The emulsion of claim 1, wherein $R^2$ is selected from the group consistng of hydrogen, OH, $OR^3$ and $R^3$, $R^3$ is an alkyl radical having from 1 to 4 carbon atoms and u is 1.

4. The emulsion of claim 1, wherein the ultraviolet radiation absorbing compound is represented by the formula

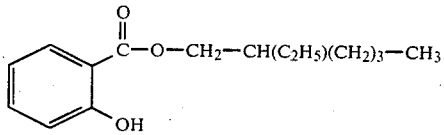

5. The emulsion of claim 1, wherein the ultraviolet radiation absorbing compound is represented by the formula

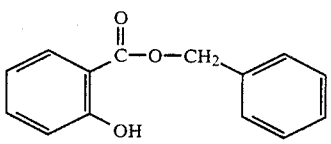

6. The emulsion of claim 1, wherein the ultraviolet radiation absorbing compound is represented by the formula

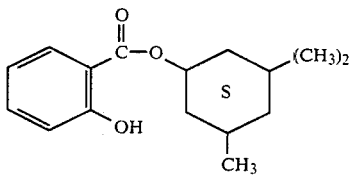

7. The emulsion of claim 1, wherein the ultraviolet radiation absorbing compound is represented by the formula

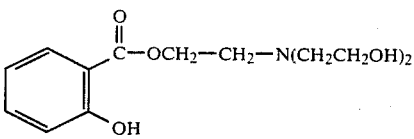

8. The emulsion of claim 1, wherein the ultraviolet radiation absorbing compound is represented by the formula

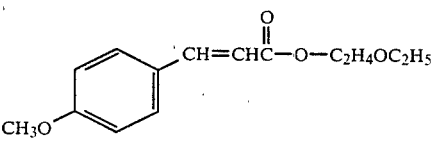

9. The emulsion of claim 1, wherein the ultraviolet radiation absorbing compound is represented by the formula

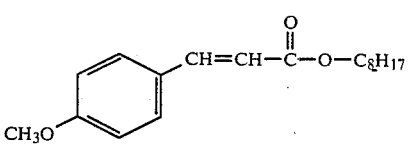

10. The emulsion of claim 1, wherein the ultraviolet radiation absorbing compound is represented by the formula 11. The emulsion of claim 1, wherein the ultraviolet radiation absorbing compound is represented by the formula

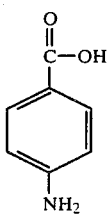

12. The emulsion of claim 1, wherein the ultraviolet radiation absorbing compound is represented by the formula

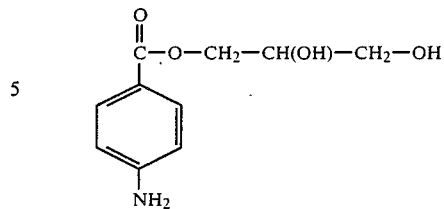

13. The emulsion of claim 1, wherein the organopolysiloxane fluid is a hydroxyl containing organopolysiloxane fluid.

14. The emulsion of claim 1, wherein the organopolysiloxane fluid is a mixture containing a hydroxyl terminated organopolysiloxane fluid and a triorganosiloxy terminated organopolysiloxane fluid.

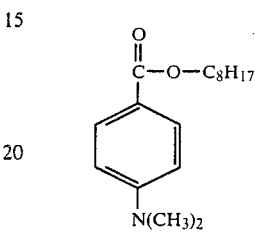

* * * * *